(12) United States Patent
McGahey, Jr.

(10) Patent No.: US 6,818,035 B2
(45) Date of Patent: Nov. 16, 2004

(54) WINDOW BIOLOGICAL AND CHEMICAL CONTAMINATION FILTER

(76) Inventor: Harry V. McGahey, Jr., 1532 Sixth Ave., San Diego, CA (US) 92101

( * ) Notice: Subject to any disclaimer, the term of this patent is extended or adjusted under 35 U.S.C. 154(b) by 0 days.

(21) Appl. No.: 10/287,879

(22) Filed: Oct. 29, 2002

(65) Prior Publication Data

US 2004/0079058 A1 Apr. 29, 2004

Related U.S. Application Data

(60) Provisional application No. 60/348,880, filed on Oct. 26, 2001.

(51) Int. Cl.[7] .......................... B01D 27/06; B01D 46/00; B01D 53/04
(52) U.S. Cl. ...................... 55/385.1; 55/385.3; 55/470; 55/471; 55/482.1; 55/484; 55/DIG. 33; 96/135; 96/138; 96/142; 96/147; 96/151
(58) Field of Search ............................... 55/342, 342.1, 55/350.1, 359, 383, 385.1, 385.3, 467, 418–420, 467.1, 484, 482.1, 470–473, DIG. 33; 96/135–138, 142, 147, 151

(56) References Cited

U.S. PATENT DOCUMENTS

| 3,266,490 A | * | 8/1966 | Klinger et al. ......... 128/206.15 |
| 3,606,998 A | * | 9/1971 | La Porte et al. ............ 422/120 |
| 4,019,508 A | * | 4/1977 | Der Estephanian et al. .. 128/202.19 |
| 4,025,325 A | * | 5/1977 | Goodwin, Jr. ............... 55/357 |
| 4,042,357 A | * | 8/1977 | Gysi .......................... 55/417 |
| 4,452,241 A | * | 6/1984 | Sarnoff et al. ......... 128/204.18 |
| 4,526,592 A | * | 7/1985 | Armbruster .................. 96/121 |
| 4,640,278 A | * | 2/1987 | Barry .................... 128/206.12 |
| 4,810,269 A | * | 3/1989 | Stackhouse et al. .......... 96/381 |
| 5,000,381 A | * | 3/1991 | Mueller et al. ........... 236/44 C |
| 5,125,239 A | * | 6/1992 | Kobayashi et al. ........... 62/262 |
| 5,215,498 A | * | 6/1993 | Wong et al. ................ 454/208 |
| 5,221,520 A | * | 6/1993 | Cornwell ..................... 422/122 |
| 5,372,130 A | * | 12/1994 | Stern et al. ............ 128/205.25 |
| 5,584,286 A | * | 12/1996 | Kippax .................. 128/200.24 |
| 5,665,143 A | * | 9/1997 | Jarvis et al. .................... 95/96 |
| 5,875,775 A | * | 3/1999 | Nur et al. ............. 128/201.28 |
| 5,957,131 A | * | 9/1999 | Hutchinson et al. ... 128/206.17 |
| 6,296,693 B1 | * | 10/2001 | McCarthy ................... 96/117.5 |
| 6,497,756 B1 | * | 12/2002 | Curado et al. ............. 96/117.5 |
| 2002/0020297 A1 | * | 2/2002 | Harris et al. .................. 95/273 |

* cited by examiner

Primary Examiner—Robert H. Spitzer
(74) Attorney, Agent, or Firm—McGahey & McGahey, APC; Harry V. McGahey, Esq.

(57) ABSTRACT

Disclosed herein is a window mounted biological and chemical contamination filter system consisting of a window mounted fan system connected to one or more standard biological and chemical gas mask cartridges affixed to the portion of the window unit extending out to the outside of the window where it is installed.

9 Claims, 5 Drawing Sheets

WINDOW BIOLOGICAL AND CHEMICAL CONTAMINATION FILTER

CROSS REFERENCE

This application is entitled to the benefit of a U.S. provisional application No. 60/348,880 filed Oct. 26, 2001.

FIELD OF THE INVENTION

This invention relates to a biological and chemical contamination filter which can be placed in the window of a building to protect the occupants in case of biological or chemical attack. The system is especially suitable for small buildings which do not warrant a separate, expensive filter system for protection from outside biological or chemical contamination.

BACKGROUND OF THE INVENTION

There is currently a need for a low cost, easily installed air filter to protect from possible chemical or biological attack. The American Red Cross recommends that in the event of terrorist attack, that a residential user tape their windows shut to avoid any intake of air. The problem is that unless this is for a very short duration, the danger of suffocation from a lack of fresh air is very real. A person must therefore choose between being exposed to the harmful biological or chemical agent, or expiring from a lack of oxygen.

Currently available building gas filtration systems generally contain multiple parts which must be custom manufactured, assembled and fit together making a unit which is expensive to manufacture, maintain and operate. There is a need for a system which can be quickly installed, operated and maintained.

Historical attempts to address some or all of the above limitations are reflected in the following prior art:

U.S. Pat. No. 3,266,490, Aug. 16, 1996, Klinger et. al., United States (US) is a pocket respirator which can be carried with the person. Such a solution is not conducive to protecting a number of persons working or living inside a structure.

U.S. Pat. No. 4,452,241, Jun. 5, 1984, Sarnoff, United States (US) is a resuscitating system for a plurality of persons using cartridges. The purpose of the instant invention is to prevent having to resort to resuscitation by protecting the occupants of a building prior to exposure.

U.S. Pat. No. 4,640,278, Feb. 3, 1987, Barry, United States (US) is an emergency air access system placed in a window sill. The major disadvantage of this system is that to use it an occupant must breath through a tube. If there are more occupants than breathing tubes, this system will not be able to protect all of the occupants in the building.

U.S. Pat. No. 5,000,381, Mar. 19, 1991, Mueller, United States (US) is an example of a typical window fan which can be installed in a window. Although it can provide fresh air for the occupants of a building, it is not designed to protect the occupants from biological or chemical contamination outside the building.

U.S. Pat. No. 5,215,498, Jun. 1, 1993, Wong, United States (US) is a system to control the carbon dioxide level into a room for ventilation purposes but it does not have any way to filter the air from dangerous biological or chemical contaminants.

U.S. Pat. No. 5,221,520, Jun. 22, 1993, Cornwell, United States (US) shows an apparatus for filtering air being brought indoors, but the system uses a series of filter beds which would require custom design and would be complex and expense to manufacture and maintain.

U.S. Pat. No. 5,372,130, Dec. 13, 1994, Stern, United States (US) shows a face mask assembly with a fan and a replaceable filter. This system is designed for protecting one individual at a time and cannot protect an indoor room or interior of a vehicle with multiple occupants.

U.S. Pat. No. 5,584,286, Dec. 17, 1996, Kippax, United States (US) is an integrated breathing system which connects each occupant of an indoor room by a hose or tube to a window mounted system blowing fresh air into individual mask respirators. Only fresh air is pumped in and the system is not designed to protect from chemical or biological contamination outside. Further, the occupants must wear a bulky respirator and are physically constrained by the hoses and tubes leading to the window fan.

U.S. Pat. No. 5,665,143, Sep. 9, 1997, Jarvis, United States (US) is an air filtration system for a building typical of the complex systems currently available for protecting interior occupants of buildings.

U.S. Pat. No. 5,875,775, Mar. 2, 1999, Nur, is a protective mask consisting of a fire-resistant stretchable material with an access opening. As stated regarding previous prior art, it is inconvenient to require each occupant of an interior room to have a protective mask or head covering.

U.S. Pat. No. 5,957,131, Sep. 28, 1999, Hutchinson et. al., United States (US), is a biological warfare half mask which gives more freedom and comfort for the wearer, but still would be inconvenient indoors when voice communication to others would be desired or necessary.

U.S. Pat. No. 6,296,693, Oct. 2, 2001, McCarthy, United States (US), is a "Life cell" which incorporates a HEPA filter and Biological and Chemical warfare filters, but the system requires a custom made filter using specific materials and therefore must be designed, manufactured, and installed in a custom manner with the attendant cost, time, and effort that the current invention avoids.

This invention solves the above problems described in previous technology. It consists of an enclosure for a window fan which has mounted on the outside, sockets, threads or other standard coupling devices currently used by standard biological and chemical warfare gas masks. This allows the user to connect a currently commercially available gas mask cartridge onto a window mounted fan. This allows one to use gas mask cartridges which are available at this time by current manufacturers. This invention uses standard chemical filter cartridges which are easily removed, replaced and/or exchanged when necessary by attaching them or screwing them into standard size base adapters. This invention combines the standard gas mask cartridge concept with window fan technology currently available. Window fan systems are available which install easily into almost any size window. Combining these two systems provides a system enabling a homeowner or office user, as well as vehicle occupants, to increase their chances of surviving a short term chemical or biological attack.

SUMMARY OF THE INVENTION

The invention utilizes a sealed window mounted fan connected to a standard size gas mask mount and a standard size gas mask cartridge. More than one gas mask mount and cartridge may be used with more than one fan to increase the air capacity. A remotely detachable system is used to keep the gas mask canister's protected and fresh until their use is needed. This system can use strong permanent magnets which when the interior ones are pulled away, electromagnets actuated by the user, or any means allowing remote detachment of the protective housing from the interior of the structure or vehicle.

There is a one way valve or valves to ensure that there is a flow of air in the direction desired. Different size screw on adapters can be used to mount different manufacturer's gas mask cartridges onto the standard gas mask mount supplied with the unit. By the term "Standard Gas Mask Cartridge" is meant the cartridge used by a particular manufacturer which is standard for gas masks used by that manufacturer, or the size of mounting used by various manufacturers in a particular industry from which the cartridges are purchased or manufactured for.

The invention may further be designed to utilize multiple sources of power to ensure that the system can be used whenever desired regardless of the availability of various power sources. The system may utilize solar power, AC/DC power, hand crank power, disposable battery power and/or rechargeable battery power.

The system may also be connected if desired to heating units, air conditioning units, or temperature controllers to maintain the desired interior air temperature and humidity. For instance, a window mounted air conditioner could have the invention bolted over the intake manifold so that air brought into the air conditioner would be drawn through the invention first, thereby purifying the air as it was drawn past the standard biological and/or chemical gas mask filter. Similarly, a window mounted heater could have the invention bolted over the intake manifold so that air brought into the heater would be drawn through the invention first, thereby purifying the air as it was drawn past the standard biological and/or chemical gas mask filter. Alternatively, a combination window mounted heater/air conditioner could have the invention bolted over the intake manifold so that air brought into the unit would be drawn through the invention first, thereby purifying the air as it was drawn past the standard biological and/or chemical gas mask filter. The invention could also be self purging and be able to periodically flush out the chemical and biological gas mask filters if the fan means were reversible so that it could push air in a reverse direction through the filter, thereby purging it and extending the life of the filter units being used. If a High Efficiency Particle Filter (HEPA) filter was placed over the intake of the invention, the subsequent life of the standard biological gas mask filter in place would be extended as it would not become clogged or covered with filtered residue as quickly.

The system may also be connected to a biological warfare or chemical warfare detection system to be activated automatically if desired.

The system may also contain a flashlight system to provide emergency lighting as well as filtered air in the event of an emergency.

DESCRIPTION OF THE PREFERRED EMBODIMENT

Figure 1:
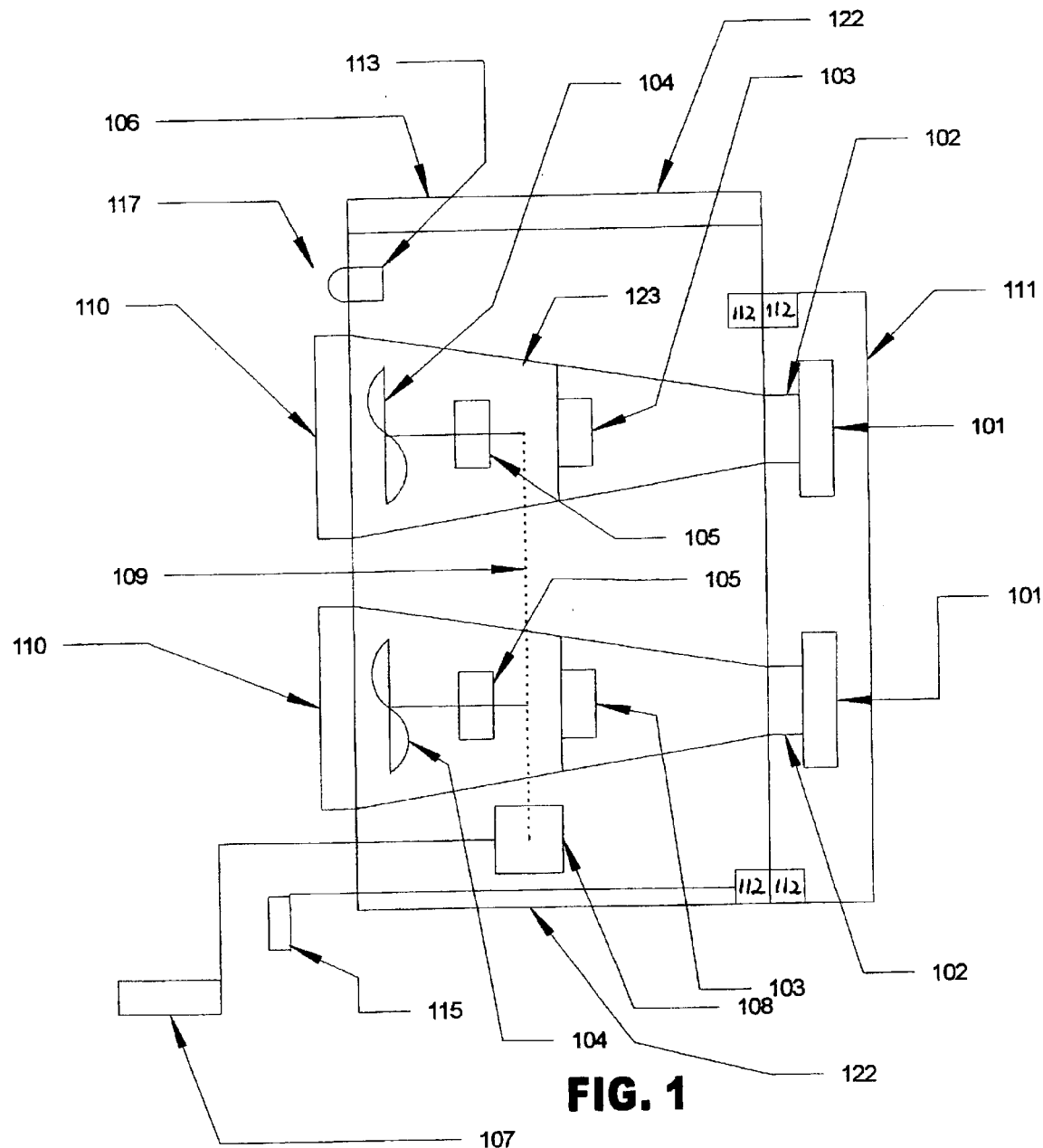
FIG. 1 illustrates a side view of the filter system embodying various features of the invention.

Although the drawings show the invention in a vertical position for a window which slides open horizontally, the invention could just as easily be built and installed to fit in a horizontal position for a window which opens vertically. Referring generally to the drawings wherein like reference numerals refer to like parts throughout the several views, FIG. 1 shows a side view with a standard gas mask cartridge 101 connected onto a standard gas mask cartridge mounting 102. Air flows through the cartridge 101 and the mounting 102 past a one way valve 103 because of the draw pressure from a fan 104 driven by an electric AC or DC motor/generator assembly 105. There may be a solar panel array 106 on the top and sides of the invention to provide the necessary electrical power to the fan 104. There may also be a hand crank 107 connected by a one way clutch system means 108 and gear or belt means 109 to create a high speed fan rotation with minimum hand cranking speed. Louvers 110 allow the direction of the air from the fan to be controlled, as well as to seal the fan from the interior if desired or required. Covering the gas mask cartridges 101 and mountings 102 is an airtight protective cover 111 which protects the gas mask cartridges 101 from corrosion or degradation by the exterior until they are needed. When put into operation, the protective cover 111 is detached by using a string, cable, or mechanical linkage means 115 to remove the magnets 112 holding them on. Other systems could also be used so long as they allow the interior occupants to detach the exterior cover without exposing themselves to the outside. This Figure also shows the light bulb 113 and light bulb cover 117 which can also be used in emergencies. The entire assembly is sealed in an airtight box 122. The fan 104, motor 105, and one way air valve 103 are all housed in a sealed fan housing 123.

Figure 2:
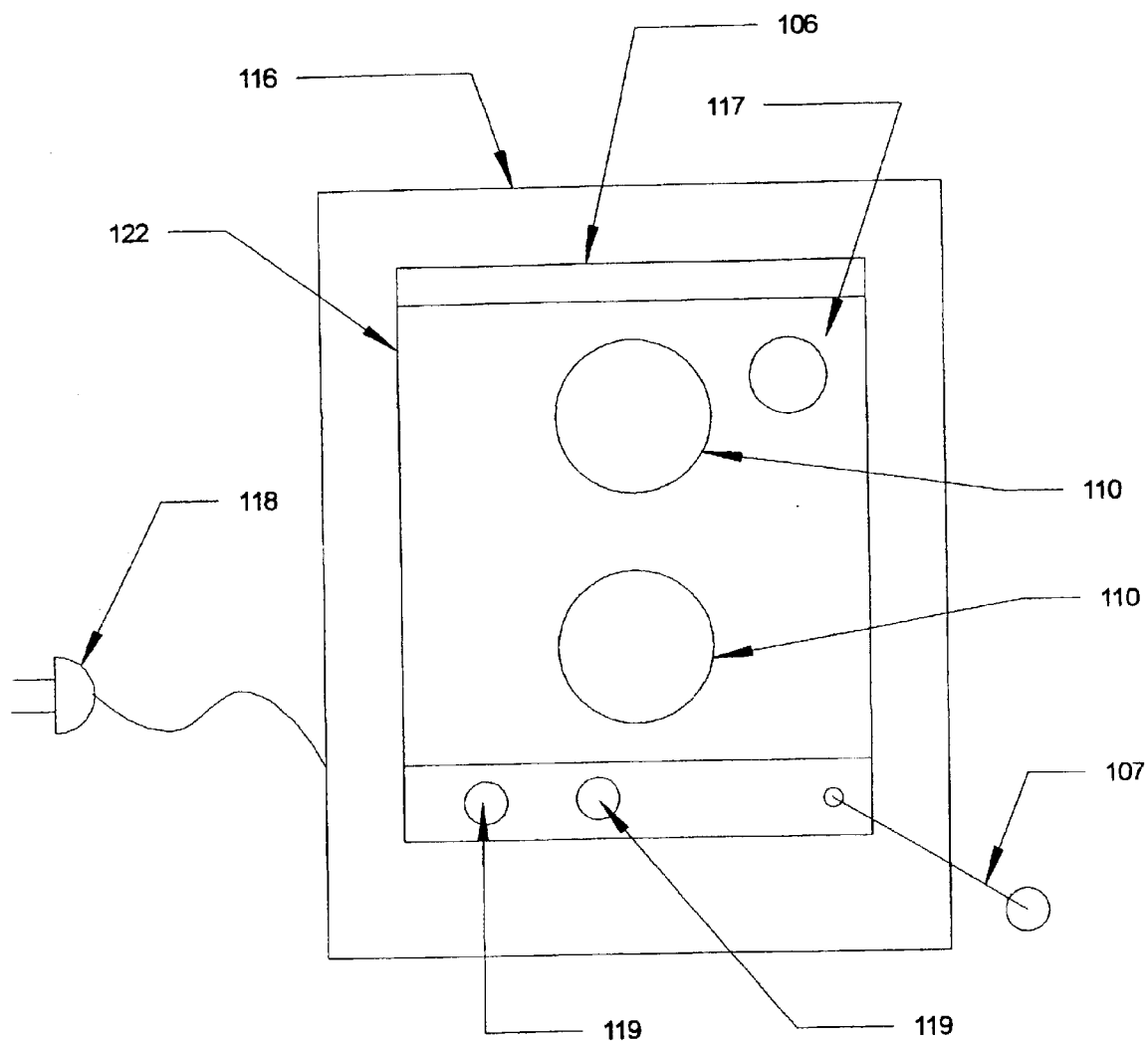
FIG. 2 is an interior front view of the invention.

FIG. 2 is an interior front view showing flashing used to seal the window 116 and the flashlight 113 and light cover 117 which can also be used in emergencies and the front panel controls 119 for turning the unit on, choosing the charging system to be used and for choosing what type of power to operate the system. Also is shown the AC/DC cord 118 for plugging the system into a standard electrical line. Also can be seen the operator's control panel means 119 showing the choices available for operation of the fan and the light.

Figure 3:
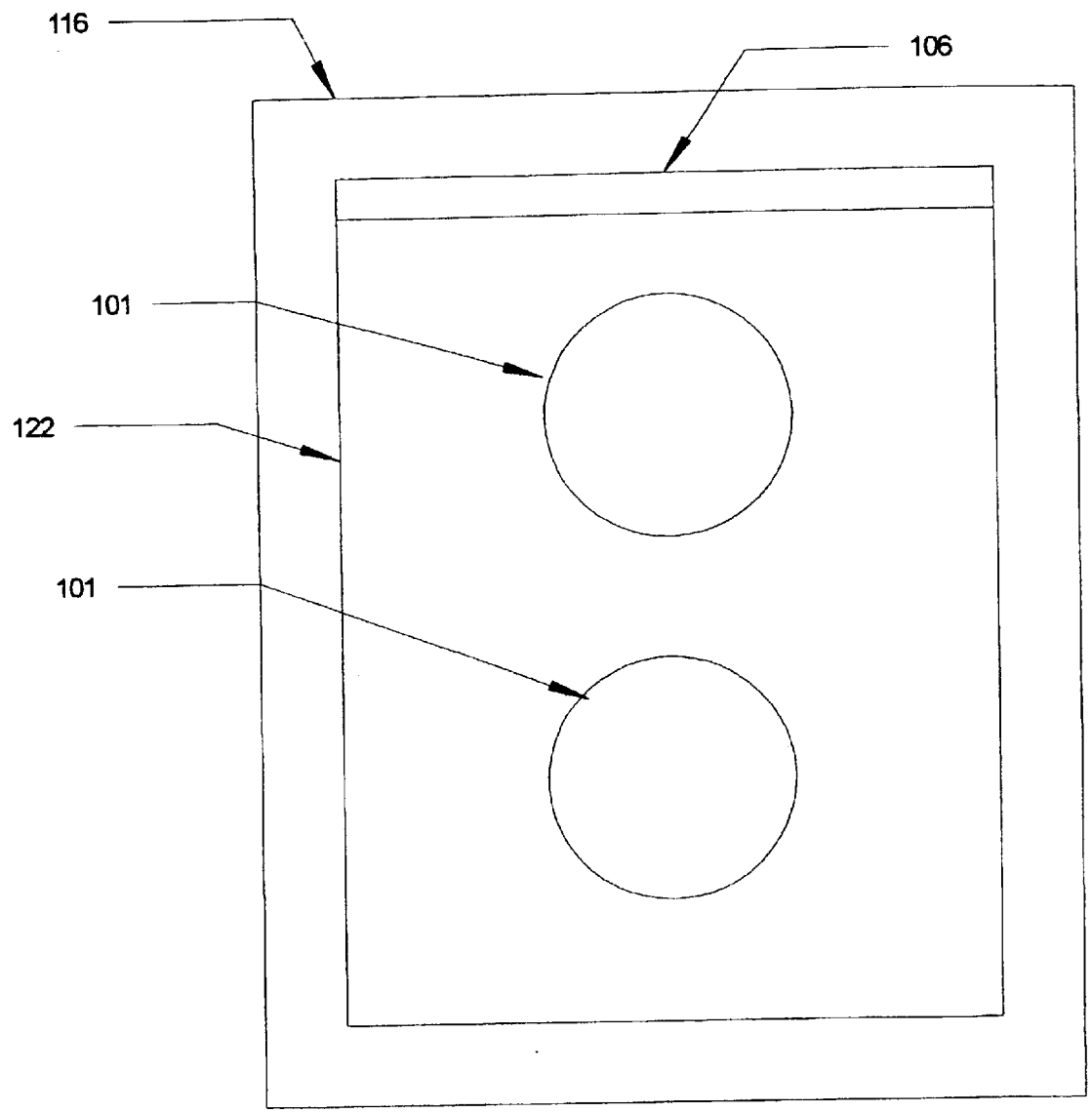
FIG. 3 is an exterior rear view of the system.

FIG. 3 is an exterior rear view of the system showing the gas mask cartridges installed on the exterior.

Figure 4:
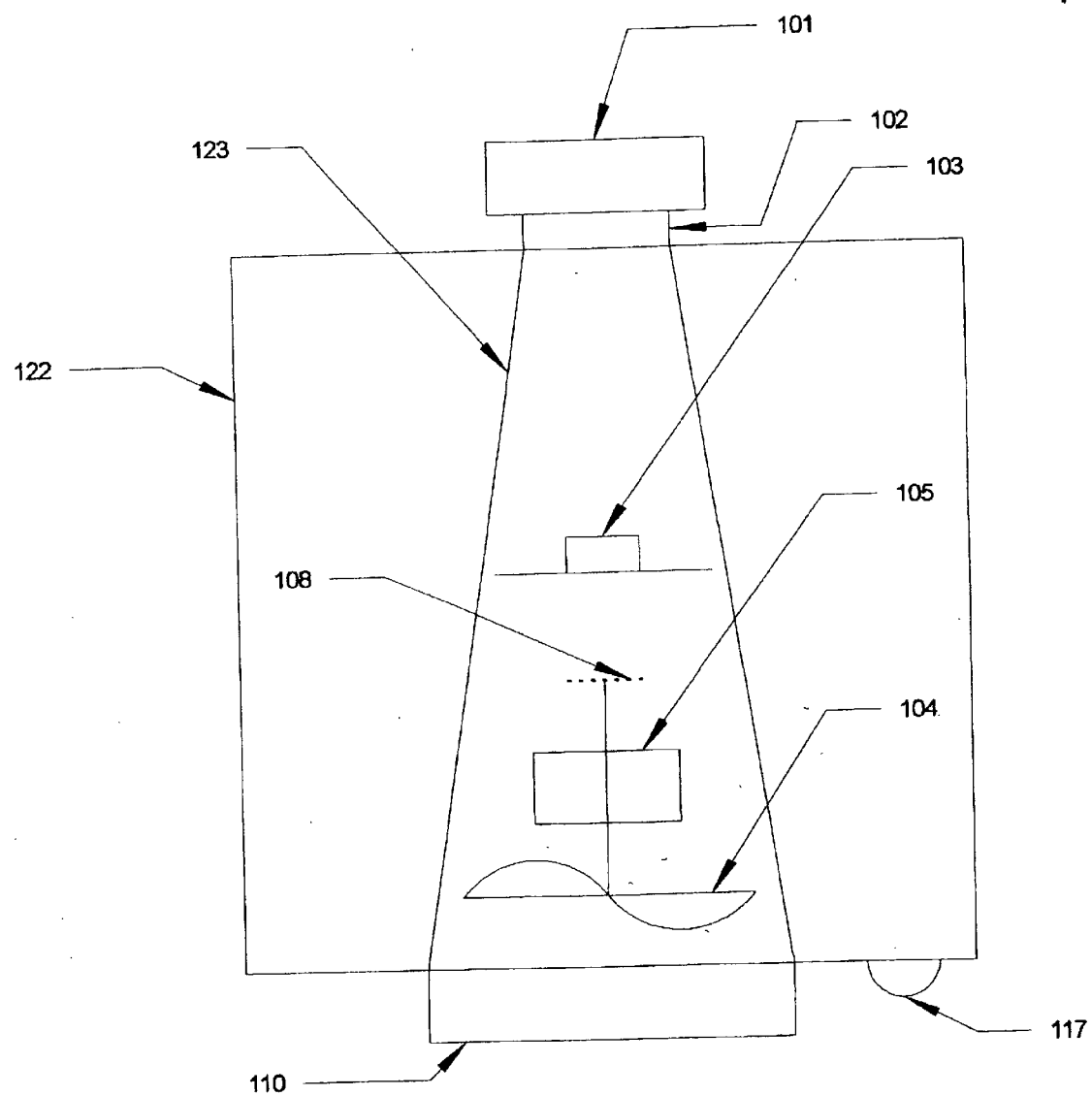
FIG. 4 is a top view looking down showing the interior of the invention from above.

FIG. 4 is a top view looking down showing the interior of the invention from above with the flashings 116 used to seal the window in conjunction with an inert sealant to seal any air leaks between the window and the invention.

Figure 5:
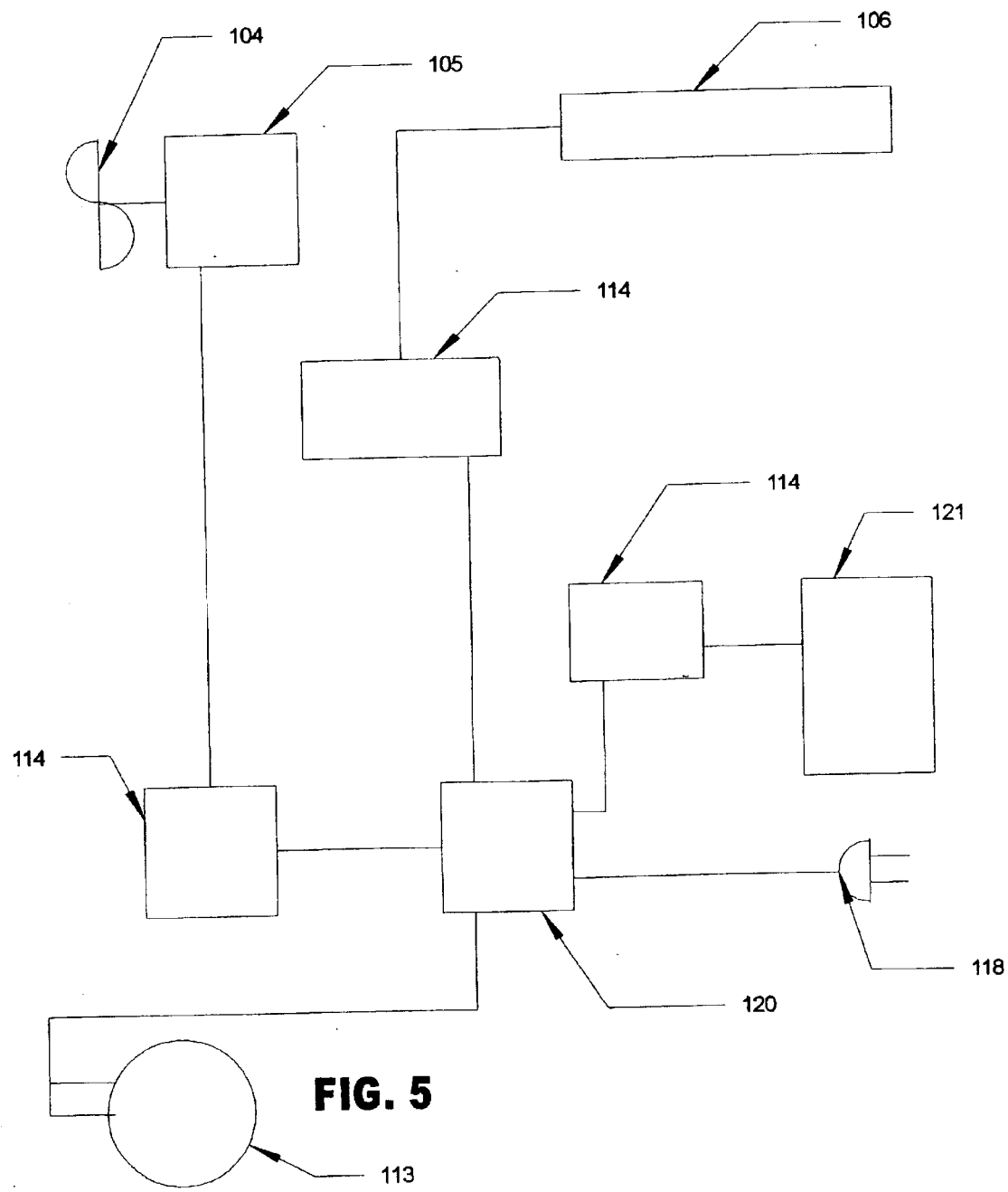
FIG. 5 shows the basic electrical circuit means used to control the invention.

FIG. 5 shows the basic electrical circuit means used to control the invention if multiple sources of power and recharging are desired. A Voltage Regulation means 114 and Switching System Means 120 can be used with a Battery Means 121 to choose the power source to be used to operate the filter.

While the preferred embodiments of the invention have been described, modifications can be made and other embodiments may be devised without departing from the spirit of the invention and the scope of the appended claims. For instance, the number of mountings, fans, and motors could be increased to any desired number which would still fit within the window frame desired. Also, the type of fan used could be the propeller shape shown in the drawings, or a squirrel cage or other type of blower means could be used to bring the air past the gas mask cartridges.

What is claimed is:

1. A Biological and Chemical Contamination Filter comprising:
   a. a plurality of rotating fans mounted;
   b. in a window or door of a structure or a vehicle;
   c. which draw air in from the outside;
   d. an airtight tube surrounding each fan to allow air to be drawn from the exterior of the window or door of the structure or vehicle;
   e. a one way valve between each fan and the exterior to prevent interior air from becoming contaminated by exterior air when the fan is not operating;
   f. a standard gas mask mounting between each one way valve and the exterior which accepts a standard biological and chemical gas mask filter;
   g. flashing and inert sealant means to create an air tight seal for the entire system placed into the window or door of a structure or vehicle.

2. The Biological and Chemical Contamination Filter of claim 1 with a remotely detachable exterior housing protecting the standard biological and chemical gas mask filter from the exterior until they are needed comprising:
   a. an air tight cover fitting over the standard biological and chemical gas mask filter;
   b. a manual, electric, or magnetic means to detach the cover from the inside without exposing the occupants to the contaminated exterior.

3. The Biological and Chemical Contamination Filter of claim 1 using a combination of one or more of the following power sources to rotate the fans:
   a. standard house alternating electrical current;
   b. solar panels;
   c. disposal batteries;
   d. rechargeable batteries;
   e. direct hand crank means; or
   f. belts or gear means.

4. The Biological and Chemical Contamination Filter of claim 1 including a light bulb or light bulbs to provide interior illumination for the occupants of the structure or vehicle in the event of a power outage.

5. The Biological and Chemical Contamination Filter of claim 1 installed together with an air conditioner.

6. The Biological and Chemical Contamination Filter of claim 1 installed together with a heater.

7. The Biological and Chemical Contamination Filter of claim 1 installed together with a combination heater and air conditioner.

8. The Biological and Chemical Contamination Filter of claim 1 with a reversible fan.

9. The Biological and Chemical Contamination Filter of claim 1 with a HEPA (High Efficiency Particle) Filter placed in front of the biological and chemical gas mask cartridge.

\* \* \* \* \*